US012802450B2

(12) United States Patent
Tsushima et al.

(10) Patent No.: US 12,802,450 B2
(45) Date of Patent: Nov. 17, 2026

(54) WARNING DEVICE, WARNING SYSTEM, WARNING METHOD, AND RECORD MEDIUM STORING WARNING PROGRAM

(71) Applicant: Mitsubishi Electric Corporation, Tokyo (JP)

(72) Inventors: Naoyuki Tsushima, Tokyo (JP); Tomoharu Awano, Tokyo (JP); Isamu Ogawa, Tokyo (JP); Masahiro Abukawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 15 days.

(21) Appl. No.: 18/890,161

(22) Filed: Sep. 19, 2024

(65) Prior Publication Data

US 2025/0014349 A1 Jan. 9, 2025

Related U.S. Application Data

(63) Continuation of application No. PCT/JP2022/017113, filed on Apr. 5, 2022.

(51) Int. Cl.
*G06V 20/52* (2022.01)
*G06V 40/20* (2022.01)
*G08B 23/00* (2006.01)

(52) U.S. Cl.
CPC .............. *G06V 20/52* (2022.01); *G06V 40/25* (2022.01); *G08B 23/00* (2013.01)

(58) Field of Classification Search
CPC ........ G06V 20/52; G06V 40/25; G08B 23/00; G08B 21/02
See application file for complete search history.

(56) References Cited

U.S. PATENT DOCUMENTS

2008/0097699 A1 4/2008 Ono

FOREIGN PATENT DOCUMENTS

DE 112005003266 T5 * 9/2008 ............ B60W 10/04
JP 2008-40867 A 2/2008
(Continued)

OTHER PUBLICATIONS

International Search Report (PCT/ISA/210) issued in PCT/JP2022/017113, dated Jul. 5, 2022.
(Continued)

*Primary Examiner* — Quan Zhen Wang
*Assistant Examiner* — Mancil Littlejohn, Jr.
(74) *Attorney, Agent, or Firm* — BIRCH, STEWART, KOLASCH & BIRCH, LLP

(57) ABSTRACT

A warning device includes a person position estimation unit, a movement anticipation unit that estimates a movement anticipation area based on the movement information, a vicinal situation provision unit that provides vicinal situation information including a position of an obstacle, based on at least one of the first detection signal and map information, a condition estimation unit that estimates condition of the object person based on a second detection signal outputted from a person sensor, and a risk estimation unit that outputs a warning signal when the obstacle is judged to be a warning object based on the vicinal situation information, the movement anticipation area, and the condition of the object person. The movement anticipation unit adjusts the movement anticipation area based on the condition of the object person.

9 Claims, 12 Drawing Sheets

(56) References Cited

FOREIGN PATENT DOCUMENTS

| | | | | | |
|---|---|---|---|---|---|
| JP | 2014-72753 | A | | 4/2014 | |
| JP | 2021-76934 | A | | 5/2021 | |
| KR | 10-2016-0015463 | A | | 2/2016 | |
| KR | 20160015463 | A | * | 2/2016 | ............... H04B 1/40 |
| WO | WO-2018017060 | A1 | * | 1/2018 | ....... G08B 13/19647 |

OTHER PUBLICATIONS

German Office Action for German Application No. 11 2022 006 587.7, dated May 23, 2025, with English translation.

German Office Action for German Application No. 11 2022 006 587.7, dated Aug. 13, 2026, with English translation.

* cited by examiner

WARNING DEVICE, WARNING SYSTEM, WARNING METHOD, AND RECORD MEDIUM STORING WARNING PROGRAM

CROSS-REFERENCE TO RELATED APPLICATION

This application is a continuation application of International Application No. PCT/JP2022/017113 having an international filing date of Apr. 5, 2022.

BACKGROUND OF THE INVENTION

1. Field of the Invention

The present disclosure relates to a warning device, a warning system, a warning method and a warning program.

2. Description of the Related Art

There has been proposed a device including an area information acquisition unit that acquires image information provided from an image capturing device, a storage unit that stores detection information as information for detection, a detection unit that detects a predetermined situation in a predetermined area based on the image information and the detection information, a notification unit that notifies of the detection of the predetermined situation when the predetermined situation is detected, an inference unit that infers a cause of the predetermined situation, and an update unit that updates the detection information when the detection information does not include information indicating the cause of the predetermined situation (see Patent Reference 1, for example). This device detects the predetermined situation based on the image information and the detection information stored in the storage unit and issues a warning to a person.

Patent Reference 1: Japanese Patent Application Publication No. 2021-76934 (see Claim 1 and FIG. 6, for example).

However, the above-described conventional device just anticipates the occurrence of contact between a person and an object, and thus has a problem in that reliability of the warning is lowered by frequent issuance of erroneous warnings in a room, a construction site, or the like in which objects are placed in disorder.

SUMMARY OF THE INVENTION

An object of the present disclosure is to provide a warning device, a warning system, a warning method and a warning program that make it possible to issue warnings with high reliability.

A warning device in the present disclosure includes processing circuitry to estimate movement information including a position, a moving direction and a moving speed of an object person based on a first detection signal outputted from a vicinity sensor that performs sensing in regard to a vicinity of the object person; to estimate a movement anticipation area, as an area through which the object person is anticipated to move, based on the movement information; to provide vicinal situation information including a position of an obstacle, based on at least one of the first detection signal and previously acquired map information; to estimate condition of the object person based on a second detection signal outputted from a person sensor that senses at least one of the condition and voice of the object person; and to make a judgment on whether the obstacle is a warning object or not based on the vicinal situation information, the movement anticipation area, and the condition of the object person, and to output a warning signal when the obstacle is a warning object. The processing circuitry adjusts the movement anticipation area based on the condition of the object person, the processing circuitry estimates a wobble level representing magnitude of a wobble of the object person when walking, based on the second detection signal, and the processing circuitry widens the movement anticipation area with an increase in the wobble level.

A warning method in the present disclosure is a method to be executed by a warning device. The warning method includes estimating movement information including a position, a moving direction and a moving speed of an object person based on a first detection signal outputted from a vicinity sensor that performs sensing in regard to a vicinity of the object person; estimating a movement anticipation area, as an area through which the object person is anticipated to move, based on the movement information; providing vicinal situation information including a position of an obstacle, based on at least one of the first detection signal and previously acquired map information; estimating condition of the object person based on a second detection signal outputted from a person sensor that senses at least one of the condition and voice of the object person; and making a judgment on whether the obstacle is a warning object or not based on the vicinal situation information, the movement anticipation area, and the condition of the object person, and outputting a warning signal when the obstacle is a warning object. The movement anticipation area is adjusted based on the condition of the object person, when estimating the movement anticipation area. A wobble level representing magnitude of a wobble of the object person when walking is estimated based on the second detection signal, when estimating the condition of the object person. The movement anticipation area is widened with an increase in the wobble level, when estimating the movement anticipation area.

According to the present disclosure, warnings with high reliability can be issued.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A warning device, a warning system, a warning method and a warning program according to each embodiment will be described below with reference to the diagrams. The following embodiments are just examples and it is possible to appropriately combine embodiments and appropriately modify each embodiment.

First Embodiment

Figure 1:
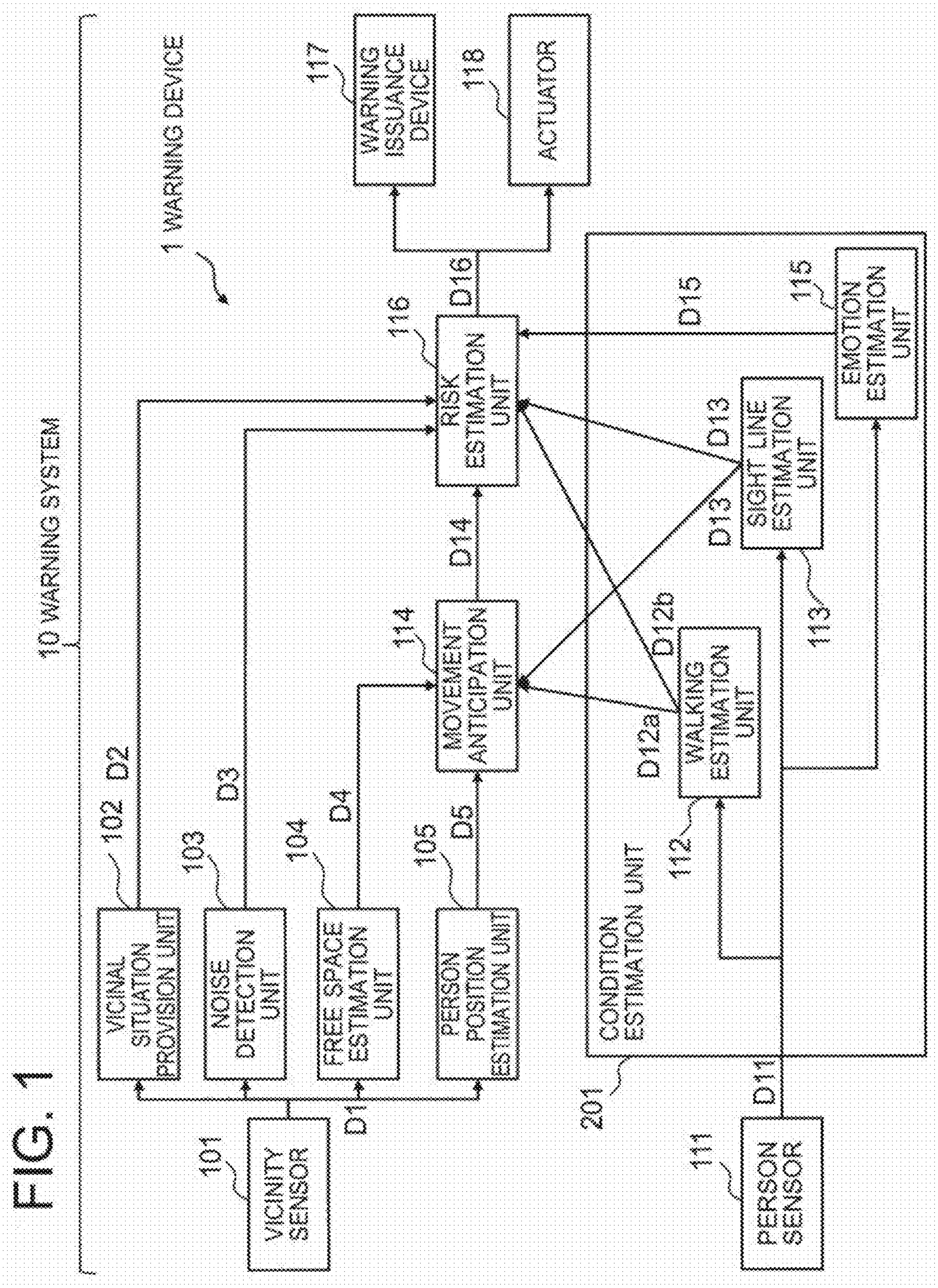
FIG. 1 is a block diagram schematically showing the configuration of a warning device and a warning system according to a first embodiment.

FIG. 1 is a block diagram schematically showing the configuration of a warning device 1 and a warning system 10 according to a first embodiment. The warning device 1 is a device capable of executing a warning method according to the first embodiment. The warning device 1 is, for example, a computer capable of executing a warning program according to the first embodiment.

The warning system 10 includes the warning device 1, a vicinity sensor 101, a person sensor 111 and a warning issuance device 117. The warning system 10 may include an actuator 118 that acts on an object person's body. The warning system 10 issues a warning with high reliability for preventing a fall or a drop to the object person as a person walking in an object area such as a factory facility or a construction site, for example.

The vicinity sensor 101 is a device that performs sensing in regard to the vicinity of the object person. The vicinity sensor 101 is, for example, a LiDAR (Light Detection and Ranging), a camera, or a combination of a LiDAR and a camera. The vicinity sensor 101 may include a microphone as a sound collection unit. The vicinity sensor 101 is placed at a position from where the whole of the vicinity of the object person can be looked over. The vicinity sensor 101 is arranged at a position where surrounding environment of the object person can be sensed. The vicinity sensor 101 is desired to be placed at a position from where the whole of the vicinity of the object person can be looked over, such as on the parietal region or the neck of the object person or on both of the parietal region and the neck.

The person sensor 111 is a device that performs sensing of movement of the object person. The person sensor 111 is, for example, a wearable sensor attached to the object person. The person sensor 111 can include, for example, a sensor (e.g., six-axis acceleration sensor) that detects the movement and acceleration of a person's parietal region, waist, foot or the like. The person sensor 111 can include a device (e.g., device in the shape of eyeglasses) that detects a person's line of sight by photographing the person's eyes. The person sensor 111 can include, for example, a microphone that is set in the vicinity of the mouth of the object person and detects voice of the object person.

The warning issuance device 117 notifies the object person of a warning by one or more of the following means: sound, light (e.g., lighting up of a lamp), displaying (e.g., a display) and vibration based on a received warning signal. The warning issuance device 117 may include a vibrating device provided on a helmet worn by the object person.

The actuator 118 is, for example, an exoskeleton device or a muscle stimulation device that is attached to the object person's body and regulates the movement of the object person's body. The actuator 118 is a device that applies force or stimulation to the object person in order to separate the person from an obstacle.

As shown in FIG. 1, the warning device 1 includes a person position estimation unit 105, a movement anticipation unit 114, a vicinal situation provision unit 102, a condition estimation unit 201 and a risk estimation unit 116. In the first embodiment, the warning device 1 may include a noise detection unit (i.e., a noise detector) 103 and a free space estimation unit 104. Further, in the first embodiment, the condition estimation unit 201 includes a walking estimation unit 112, a sight line estimation unit 113 and an emotion estimation unit 115.

The person position estimation unit 105 estimates movement information D5 including a position, a moving direction and a moving speed of the object person, based on a first detection signal D1 outputted from the vicinity sensor 101 sensing the vicinity of the object person. The person position estimation unit 105 estimates the position of the object person in a vicinal area map by analyzing three-dimensional point cloud information obtained by the LiDAR, image information obtained by the camera, or both of the three-dimensional point cloud information and the image information and using a method like SLAM (Simultaneous Localization and Mapping). It is also possible for the person position estimation unit 105 to calculate the moving direction and the moving speed of the position of the object person based on the change in the position of the object person in a time series.

The movement anticipation unit 114 estimates a movement anticipation area D14, as an area through which the object person is anticipated to move, based on the movement information D5.

The vicinal situation provision unit 102 provides vicinal situation information D2 including the position of an obstacle (e.g., a step such as a level difference, a hole, a slope or the like), based on at least one of the first detection signal D1 outputted from the vicinity sensor 101 and map information previously acquired and stored. The vicinal situation provision unit 102 detects a warning object, as an obstacle (e.g., step, hole, slope or the like) that can cause the object person to fall or drop, by analyzing the three-dimensional point cloud information obtained by the LiDAR of the vicinity sensor 101, the image information obtained by the camera of the vicinity sensor 101, or both of the three-dimensional point cloud information and the image information, for example. It is also possible to use the previously acquired map information as information indicating the obstacle that can cause the object person to fall or drop.

The condition estimation unit 201 estimates condition of the object person based on a second detection signal D11 outputted from the person sensor 111 that senses at least one of the condition and the voice of the object person.

The risk estimation unit 116 makes a judgment on whether the obstacle is a warning object or not based on the vicinal situation information D2, the movement anticipation area D14, and the condition of the object person outputted from the condition estimation unit 201, and outputs a warning signal D16 when the obstacle is a warning object.

The movement anticipation unit 114 adjusts the movement anticipation area D14 based on the condition of the object person outputted from the condition estimation unit 201.

In the first embodiment, the walking estimation unit 112 of the condition estimation unit 201 estimates a wobble level D12*a* representing magnitude of a wobble of the object person when walking, based on the second detection signal D11. For example, the walking estimation unit 112 can compare behavior of human body parts obtained by the acceleration sensor with normal-time behavior information held by the walking estimation unit 112 itself and calculate the wobble level based on magnitude of the difference between the behavior and the normal-time behavior information. It is desirable for the movement anticipation unit 114 to widen the movement anticipation area D14 with the increase in the wobble level D12*a*.

In the first embodiment, the walking estimation unit 112 estimates a foot elevation level D12*b* of the object person when walking based on the second detection signal D11. For example, the walking estimation unit 112 calculates the foot elevation level when walking based on an output signal from the acceleration sensor attached to a foot of the object person as the person sensor 111. It is desirable for the risk estimation unit 116 to make the judgment on whether the obstacle is a warning object or not based on the vicinal situation information D2, the movement anticipation area D14, and the foot elevation level D12*b* of the object person.

It is permissible even if the walking estimation unit 112 executes only one of the estimation of the wobble level D12*a* of the object person when walking and the estimation of the foot elevation level D12*b* of the object person when walking.

The sight line estimation unit 113 estimates a fixation point D13 indicating a position at which the object person is gazing, based on the second detection signal D11 outputted from the person sensor 111. For example, the sight line estimation unit 113 calculates what present region the object person is gazing at, that is, the fixation point as the position the object person is currently gazing at, based on the result of the sight line detection by the person sensor 111. It is desirable for the movement anticipation unit 114 to narrow the movement anticipation area D14 with the decrease in the degree of spreading of the distribution of the fixation point D13. Further, the risk estimation unit 116 can regard an obstacle overlapping with the fixation point D13 as not being a warning object when making the judgment on whether the obstacle is a warning object or not. That is, the risk estimation unit 116 can regard an obstacle situated at the same position as the fixation point D13 as not being a warning object.

The emotion estimation unit 115 estimates an emotion level D15 indicating the degree of excitement of the object person, based on a voice signal according to the voice of the object person in the second detection signal D11 outputted from the person sensor 111. For example, the emotion estimation unit 115 calculates present emotional condition (e.g., the emotion level such as an anger level or an impatience level) of the object person based on voice obtained by the microphone of the person sensor 111. The emotion level can be estimated based on the volume of the voice of the person, the pitch (frequency) of the voice, or the like. It is desirable for the risk estimation unit 116 to regard all obstacles in the movement anticipation area D14 as warning objects when the emotion level D15 exceeds a previously set threshold level. For example, when the emotion level D15 exceeds the previously set threshold level, the risk estimation unit 116 may regard all obstacles in the movement anticipation area D14, including the obstacle overlapping with the fixation point D13, as warning objects.

The noise detection unit 103 calculates the level of noise in the vicinity by detecting a noise signal D3 obtained by the microphone in the second detection signal D11 outputted from the person sensor 111. The risk estimation unit 116 is capable of determining the warning objects based on the vicinal situation information D2, the movement anticipation area D14, the condition of the object person outputted from the condition estimation unit 201, and the noise level.

The free space estimation unit 104 estimates a free space representing a region in which the object person can move, based on the first detection signal D1 outputted from the vicinity sensor 101. That is, the free space estimation unit 104 calculates the free space, as a movable region in which the person can move by walking, by detecting a flat floor, a step the person can walk up and down, and so forth based on the three-dimensional point cloud information obtained by the LiDAR of the vicinity sensor 101, the image information obtained by the camera of the vicinity sensor 101, or both of the three-dimensional point cloud information and the image information. The movement anticipation unit 114 is capable of adjusting the movement anticipation area D14 based on the free space.

The movement anticipation unit 114 calculates the movement anticipation area D14 indicating anticipated positions of the object person in the future, based on the movement information D5 including the position, the moving direction and the moving speed of the object person and acquired from the person position estimation unit 105. Further, errors in the anticipated positions become large (wide-range distribution) when the wobble level of the object person is high, and become small (narrow-range distribution) when the wobble level is low. On the assumption that the person moves in the direction of the gaze, distribution information regarding the fixation point D13 is used by use of the fixation points D13 acquired from the sight line estimation unit 113. The errors in the anticipated positions are large if the distribution of the fixation point D13 is wide, and are small if the distribution of the fixation point D13 is narrow. Further, when information on the person's movable region based on the free space D4 outputted from the free space estimation unit 104 indicates a shape like a passage, it can be inferred that the person moves along the passage, and thus it is desirable for the movement anticipation unit 114 to correct the result of the movement anticipation.

The risk estimation unit 116 judges whether or not the person's movement anticipation area D14 acquired from the movement anticipation unit 114 overlaps with an obstacle in the vicinity obtained by the vicinal situation provision unit 102. When an obstacle such as a step or a hole overlaps with the fixation point acquired from the sight line estimation unit 113, the object person has already recognized the obstacle, and thus the risk estimation unit 116 excludes the visually recognized obstacle from the warning objects. The obstacle having already been visually recognized means, for example, that the fixation point has overlapped with the same obstacle for a period longer than or equal to a predetermined set time. To overlap with something can mean not only to totally overlap with something but also to partially overlap with something.

Further, the risk estimation unit 116 may refer to the noise in the vicinity obtained by the noise detection unit 103 in the judgment on whether the obstacle is a warning object or not. It has generally been known that attentiveness in a person's visual field deteriorates (e.g., the effective visual field becomes narrower) in an environment with loud noise. When the noise level obtained based on the noise signal D3 outputted from the noise detection unit 103 exceeds a noise set value as a previously set threshold value, the risk estimation unit 116 may regard not only obstacles in the central visual field of the object person but also obstacles existing in the peripheral visual field of the object person as the warning objects irrespective of the position of the fixation point.

Furthermore, the risk estimation unit 116 may refer to the emotion level D15 outputted from the emotion estimation unit 115 in the judgment on whether the obstacle is a warning object or not. It has been known that the attentiveness and cognitive ability deteriorate, in comparison with those in normal times, when the person's emotional condition is anger, impatience or the like. Further, the person's emotion level can be estimated based on the voice of the person. Thus, the risk estimation unit 116 may regard obstacles in the movement anticipation area as warning objects irrespective of the position of the fixation point when the emotion level D15 exceeds the previously set threshold level.

Figure 2:
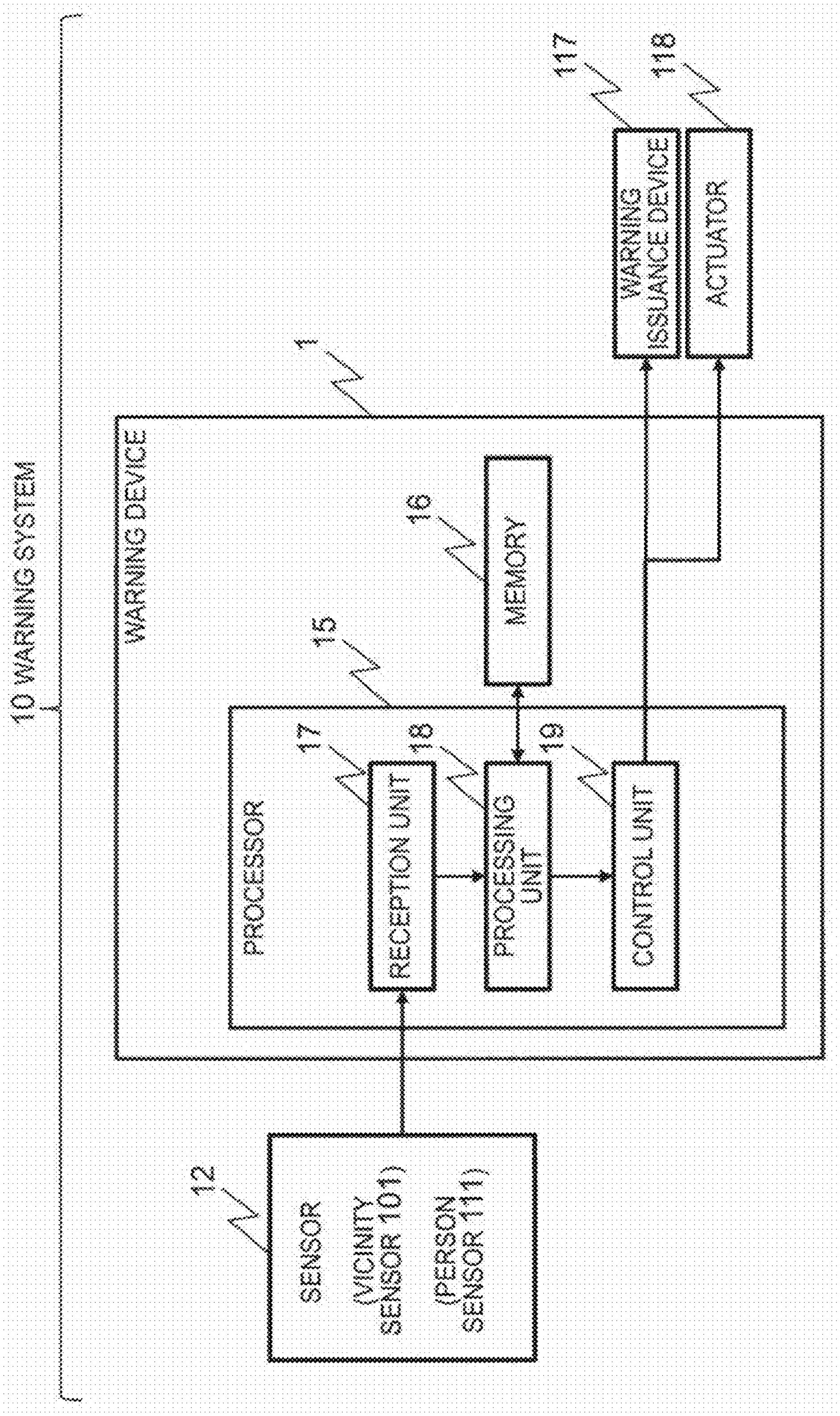
FIG. 2 is a diagram showing an example of the hardware configuration of the warning device and the warning system according to the first embodiment.

FIG. 2 is a diagram showing an example of the hardware configuration of the warning device 1 and the warning system 10 according to the first embodiment. The warning device 1 is, for example, an information processing device, namely, a computer. The warning device 1 includes a processor 15 including a reception unit 17, a processing unit 18 and a control unit 19 and a memory 16 as a volatile storage device. The warning device 1 may include a non-volatile storage device such as a hard disk drive (HDD) or a solid state drive (SSD) and a communication device that executes communication with external devices. The memory 16 is, for example, a semiconductor memory such as a RAM (Random Access Memory). The warning device 1 may be formed with a processor that executes the warning program as a software program installed from a record medium or via a communication line and stored in the memory 16. The record medium (i.e., a storage medium) is a non-transitory computer-readable record medium storing a program such as the warning program.

The functions of the warning device 1 may be implemented by processing circuitry. The processing circuitry can be either dedicated hardware or the processor 15 that executes the warning program stored in the memory 16. The processor 15 can be any one of a processing device, an arithmetic device, a microprocessor, a microcomputer and a DSP (Digital Signal Processor).

In the case where the processing circuitry is dedicated hardware, the processing circuitry is an ASIC (Application Specific Integrated Circuit), an FPGA (Field Programmable Gate Array) or the like, for example.

It is also possible to implement part of the warning device 1 by dedicated hardware and other part by software or firmware. As above, the processing circuitry is capable of implementing the above-described functions by hardware, software, firmware or a combination of some of these means.

Figure 3:
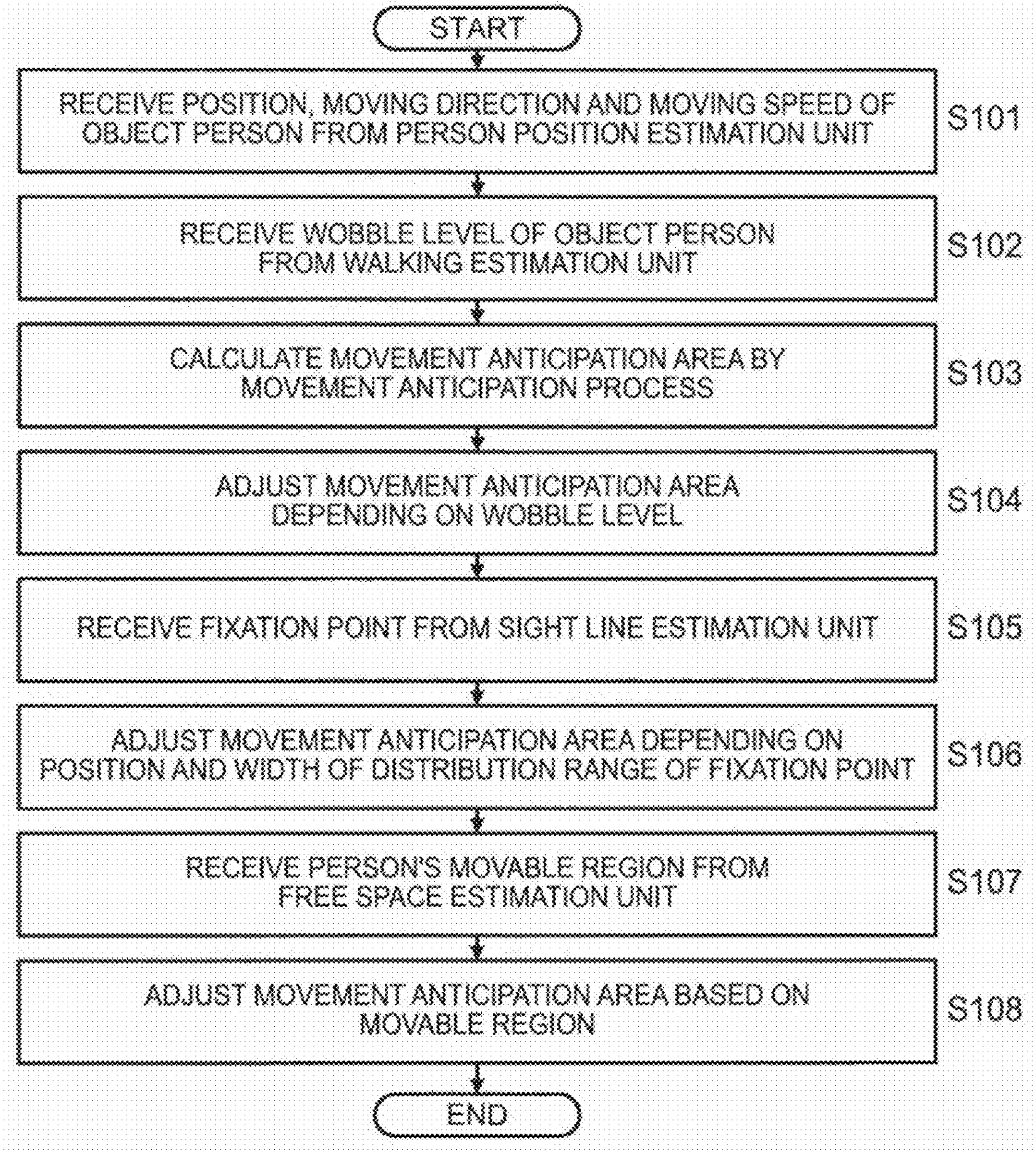
FIG. 3 is a flowchart showing an operation example of a movement anticipation unit of the warning device according to the first embodiment.

FIG. 3 is a flowchart showing an operation example of the movement anticipation unit 114 of the warning device 1 according to the first embodiment. First, the movement anticipation unit 114 receives the movement information D5 including the position, the moving direction and the moving speed of the object person from the person position estimation unit 105 (step S101), receives the wobble level D12*a* of the object person from the walking estimation unit 112 (step S102), and calculates the movement anticipation area based on the movement information D5 (step S103).

Figure 4A:
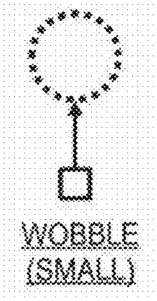
FIGS. 4A and 4B are explanatory diagrams showing the operation of the movement anticipation unit depending on a wobble level.
Figure 4B:
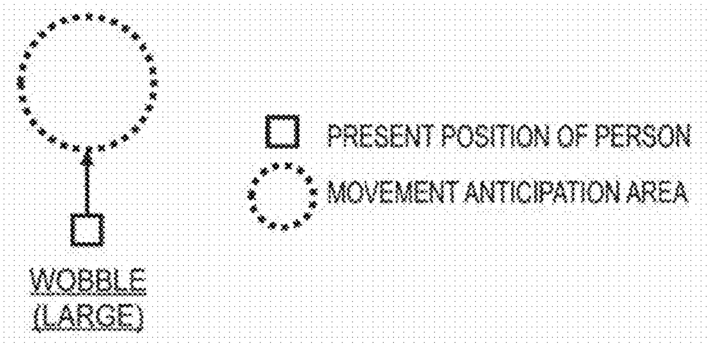

Subsequently, the movement anticipation unit 114 adjusts the movement anticipation area based on the wobble level D12*a* (step S104). FIGS. 4A and 4B are explanatory diagrams showing the operation of the movement anticipation unit 114 depending on the wobble level. For example, the movement anticipation unit 114 enlarges the movement anticipation area with the increase in the wobble level as shown in FIG. 4B, and reduces the movement anticipation area with the decrease in the wobble level as shown in FIG. 4A.

Figure 5A:
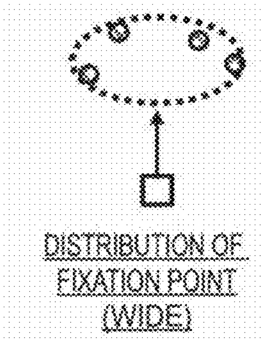
FIGS. 5A and 5B are explanatory diagrams showing the operation of the movement anticipation unit depending on distribution of a fixation point.
Figure 5B:
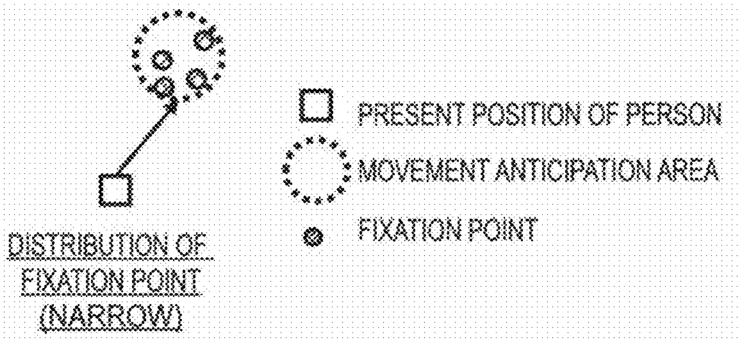

Subsequently, the movement anticipation unit 114 receives the fixation point D13 from the sight line estimation unit 113 (step S105) and adjusts the movement anticipation area based on the distribution range of the fixation point and its width, the position of the fixation point, and the wobble level D12*a*. FIGS. 5A and 5B are explanatory diagrams showing the operation of the movement anticipation unit 114 depending on the distribution of the fixation point. For example, the movement anticipation unit 114 enlarges the movement anticipation area with the increase in the width of the distribution range of the fixation point as shown in FIG. 5A, and reduces the movement anticipation area with the decrease in the width of the distribution range of the fixation point as shown in FIG. 5B.

Figure 6:
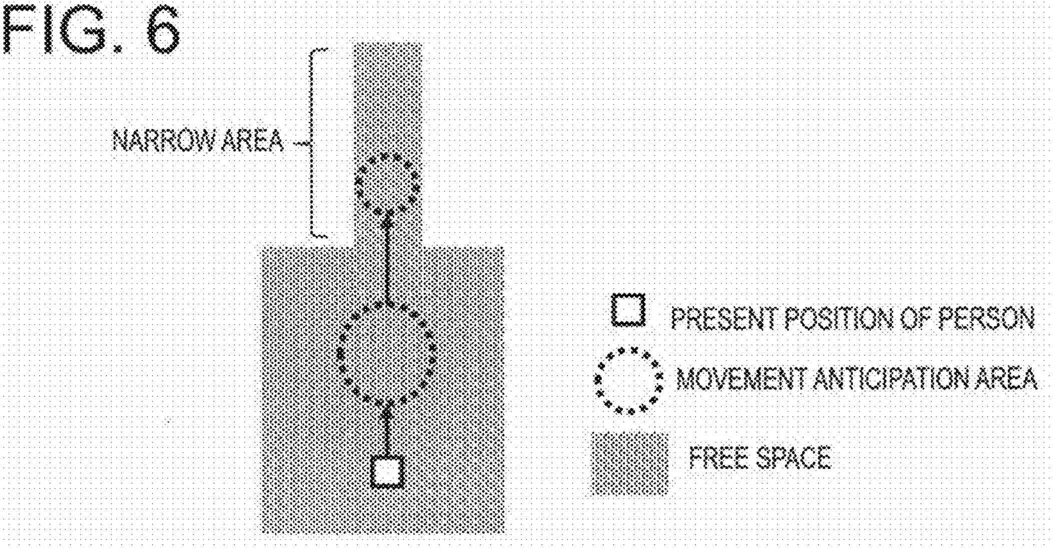
FIG. 6 is an explanatory diagram showing the operation of the movement anticipation unit depending on a free space.

Subsequently, the movement anticipation unit 114 receives the free space D4 representing the movable region of the person from the free space estimation unit 104 (step S107) and adjusts the movement anticipation area based on the movable region (step S108). FIG. 6 is an explanatory diagram showing the operation of the movement anticipation unit 114 depending on the free space. When the information on the person's movable region based on the free space D4 outputted from the free space estimation unit 104 indicates a shape like a passage (shape with a small width), it can be inferred that the person moves along the passage, and thus the movement anticipation unit 114 can reduce the movement anticipation area.

Figure 7:
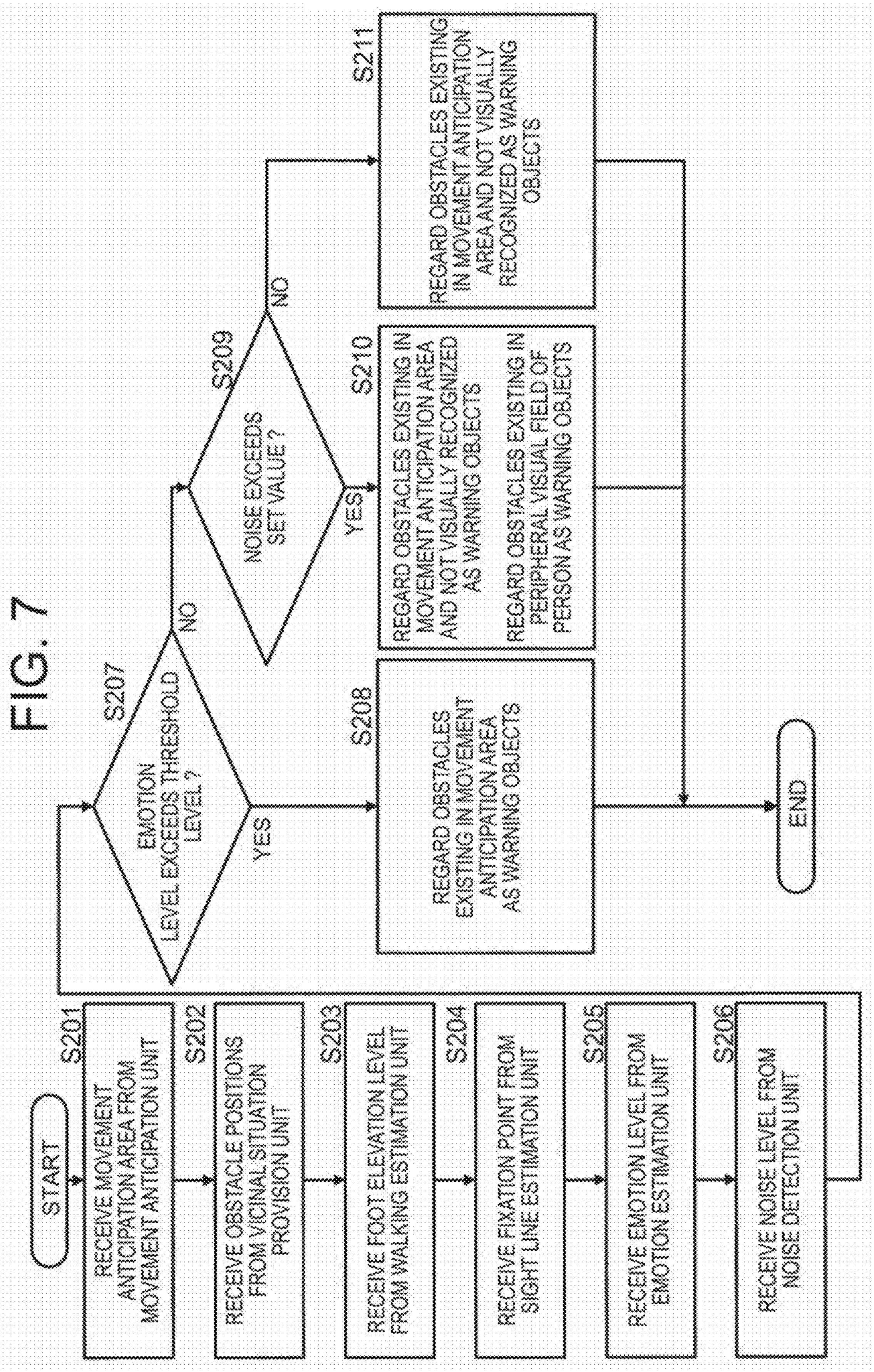
FIG. 7 is a flowchart showing an operation example of a risk estimation unit of the warning device according to the first embodiment.
Figures 8A, 8B, 8C:
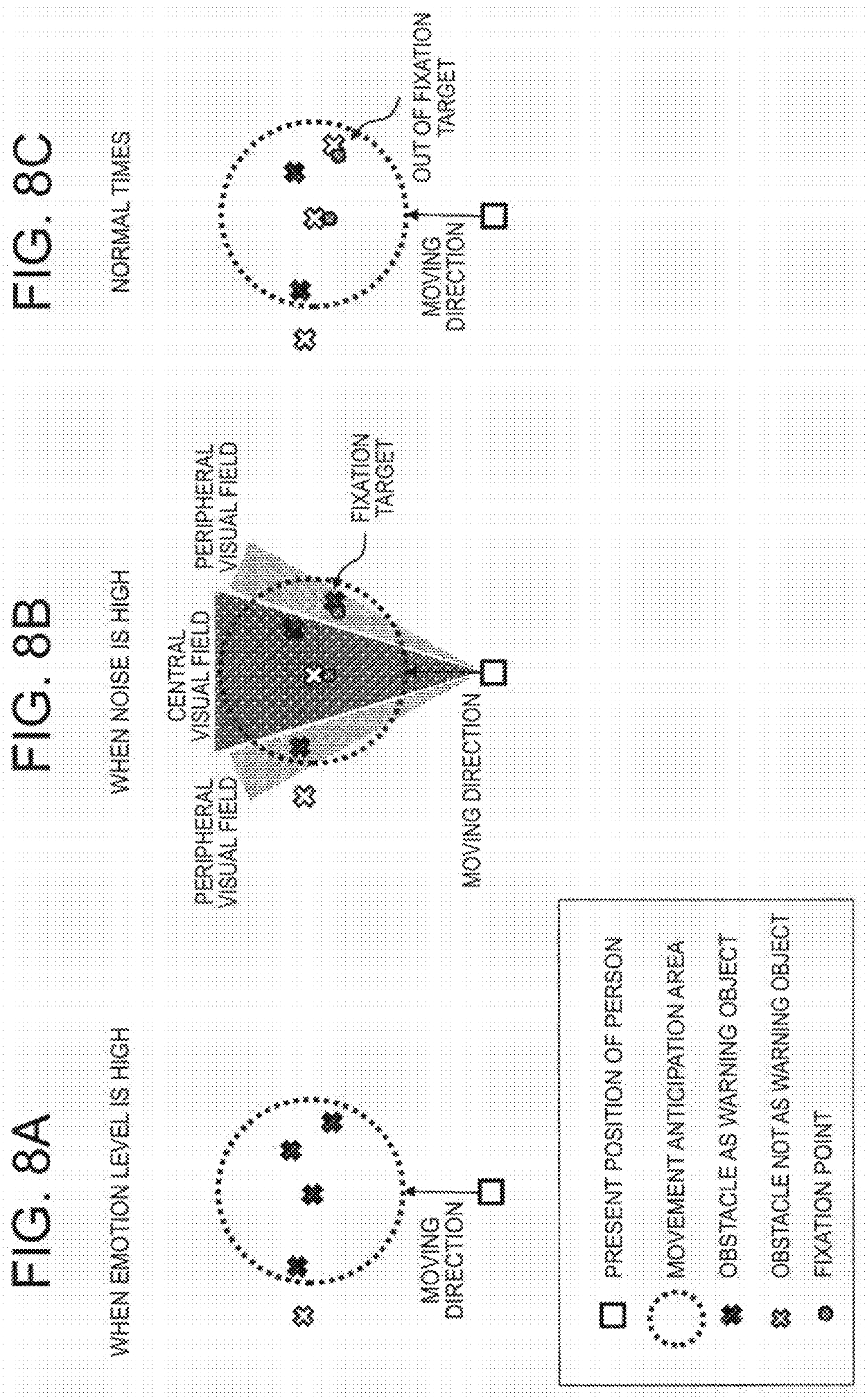
FIGS. 8A to 8C are explanatory diagrams showing a judgment made by the risk estimation unit.

FIG. 7 is a flowchart showing an operation example of the risk estimation unit 116 of the warning device 1 according to the first embodiment. FIGS. 8A to 8C are explanatory diagrams showing a judgment on whether an obstacle is a warning object or not made by the risk estimation unit 116 of the warning device 1.

The risk estimation unit 116 receives the movement anticipation area D14 from the movement anticipation unit 114 (step S201), receives the vicinal situation information D2 from the vicinal situation provision unit 102 (step S202), receives the foot elevation level D12*b*, the fixation point D13 and the emotion level D15 as the condition of the object person from the condition estimation unit 201 (steps S203-S205), receives the noise level from the noise detection unit (step S206), and if the emotion level is less than or equal to the predetermined threshold level and the noise level is less than or equal to the noise set value (NO in step S207 and NO in step S209), regards obstacles existing in the movement anticipation area and not visually recognized as the warning objects as shown in FIG. 8C (step S211).

If the emotion level D15 exceeds the predetermined threshold level (YES in step the S207), the risk estimation unit 116 regards obstacles existing in the movement anticipation area as the warning objects as shown in FIG. 8A (step S208).

If the noise represented by the noise signal D3 exceeds the predetermined noise set value (YES in the step S209), the risk estimation unit 116 regards obstacles existing in the movement anticipation area as the warning objects as shown in FIG. 8B (step S208).

As described above, according to the first embodiment, the free space D4 representing the movable region, the wobble level D12*a*, and the fixation point D13 are used in addition to the information such as the position and the moving speed of the person in order to increase the accuracy of the movement anticipation of the person, by which the accuracy of the movement anticipation area of the person can be increased.

Further, according to the first embodiment, the condition of the person (e.g., the foot elevation level D12*b*, the fixation point D13 and the emotion level D15) and the noise level are used for the judgment on whether the obstacle is a warning object or not, and thus obstacles as the warning objects can be determined appropriately and the occurrence of excessively frequent warnings can be avoided.

Second Embodiment

Figure 9:
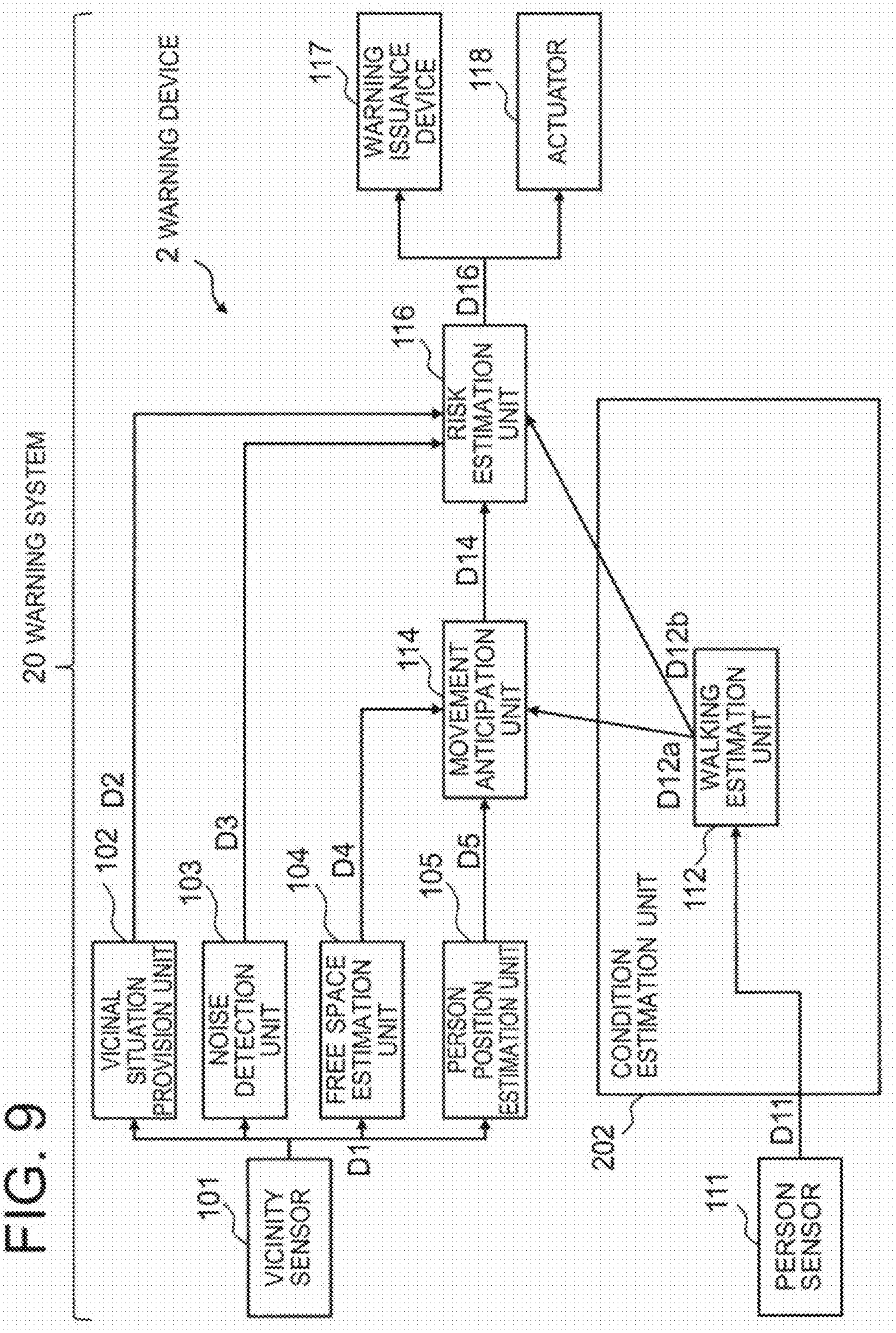
FIG. 9 is a block diagram schematically showing the configuration of a warning device and a warning system according to a second embodiment.

FIG. 9 is a block diagram schematically showing the configuration of a warning device 2 and a warning system 20 according to a second embodiment. The warning device 2 is a device capable of executing a warning method according to the second embodiment. In FIG. 9, each component identical or corresponding to a component shown in FIG. 1 is assigned the same reference character as in FIG. 1. In the warning device 2, a condition estimation unit 202 includes the walking estimation unit 112. The warning device 2 differs from the warning device 1 according to the first embodiment in not including the sight line estimation unit and the emotion estimation unit. Except for these features, the second embodiment is the same as the first embodiment.

Third Embodiment

Figure 10:
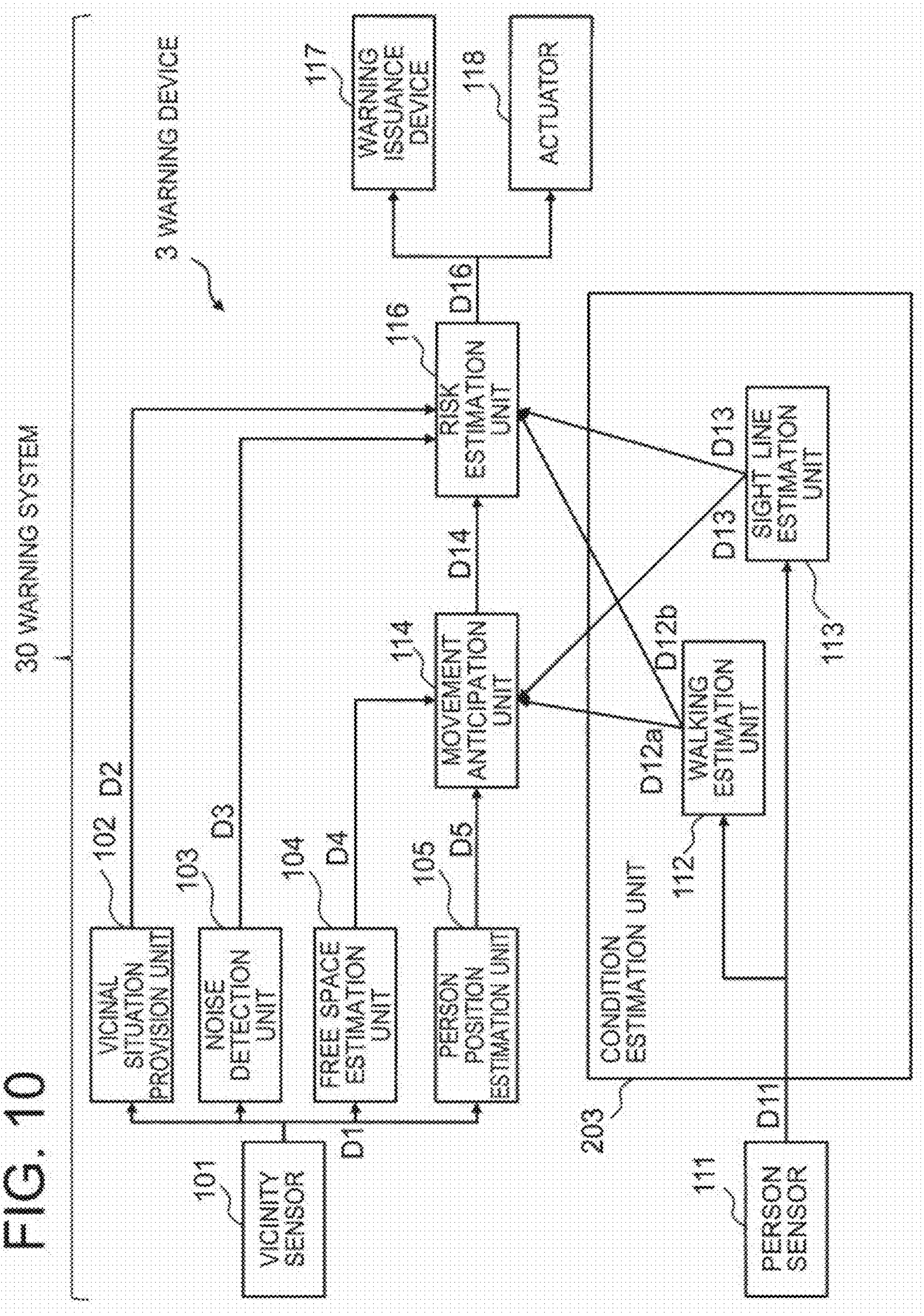
FIG. 10 is a block diagram schematically showing the configuration of a warning device and a warning system according to a third embodiment.

FIG. 10 is a block diagram schematically showing the configuration of a warning device 3 and a warning system 30 according to a third embodiment. The warning device 3 is a device capable of executing a warning method according to the third embodiment. In FIG. 10, each component identical or corresponding to a component shown in FIG. 1 is assigned the same reference character as in FIG. 1. In the warning device 3, a condition estimation unit 203 includes the walking estimation unit 112 and the sight line estimation unit 113. The warning device 3 differs from the warning device 1 according to the first embodiment in not including the emotion estimation unit. Except for these features, the third embodiment is the same as the first embodiment.

Fourth Embodiment

Figure 11:
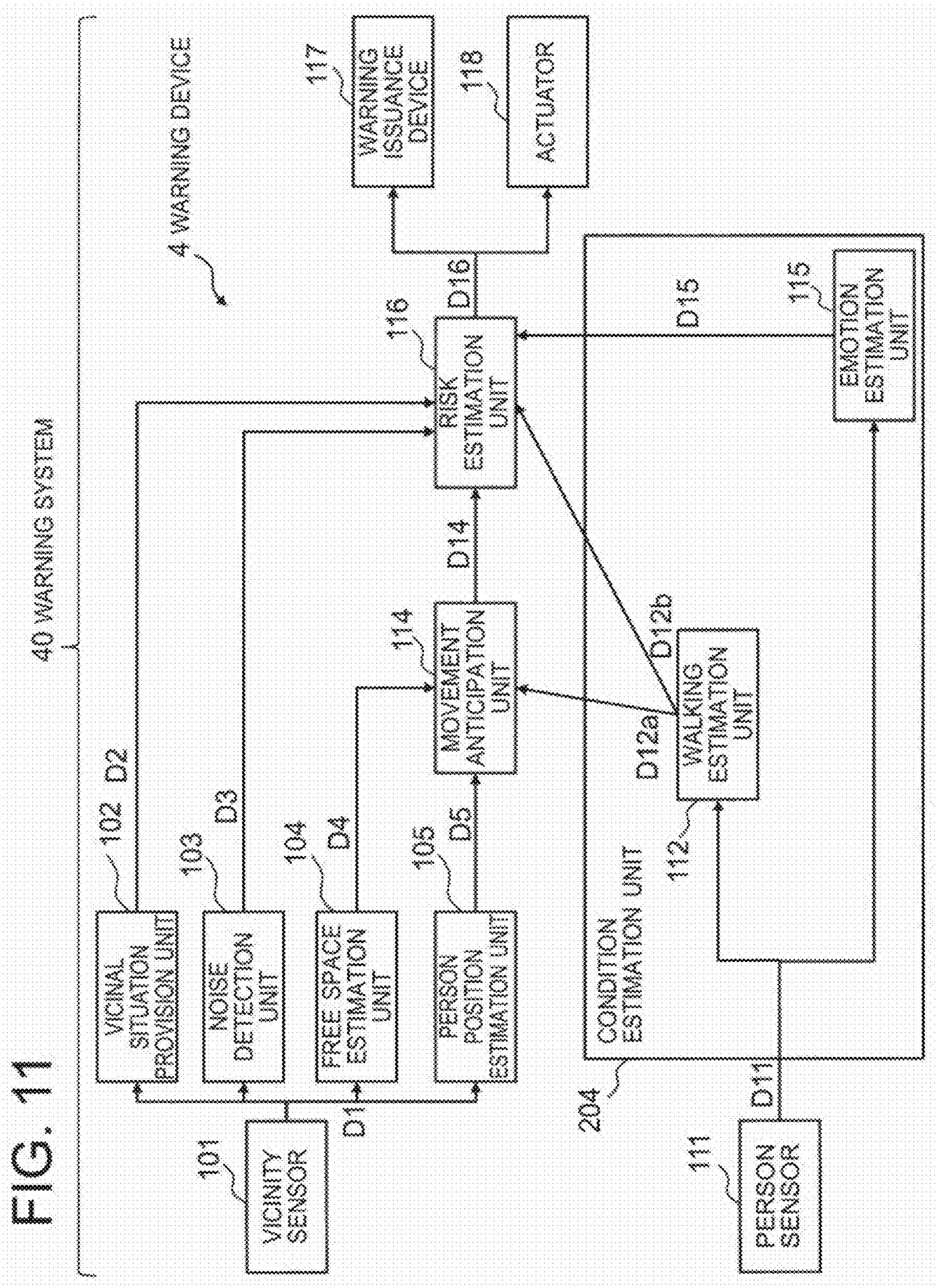
FIG. 11 is a block diagram schematically showing the configuration of a warning device and a warning system according to a fourth embodiment.

FIG. 11 is a block diagram schematically showing the configuration of a warning device 4 and a warning system 40 according to a fourth embodiment. The warning device 4 is a device capable of executing a warning method according to the fourth embodiment. In FIG. 11, each component identical or corresponding to a component shown in FIG. 1 is assigned the same reference character as in FIG. 1. In the warning device 4, a condition estimation unit 204 includes the walking estimation unit 112 and the emotion estimation unit 115. The warning device 4 differs from the warning device 1 according to the first embodiment in not including the sight line estimation unit. Except for these features, the fourth embodiment is the same as the first embodiment.

Fifth Embodiment

Figure 12:
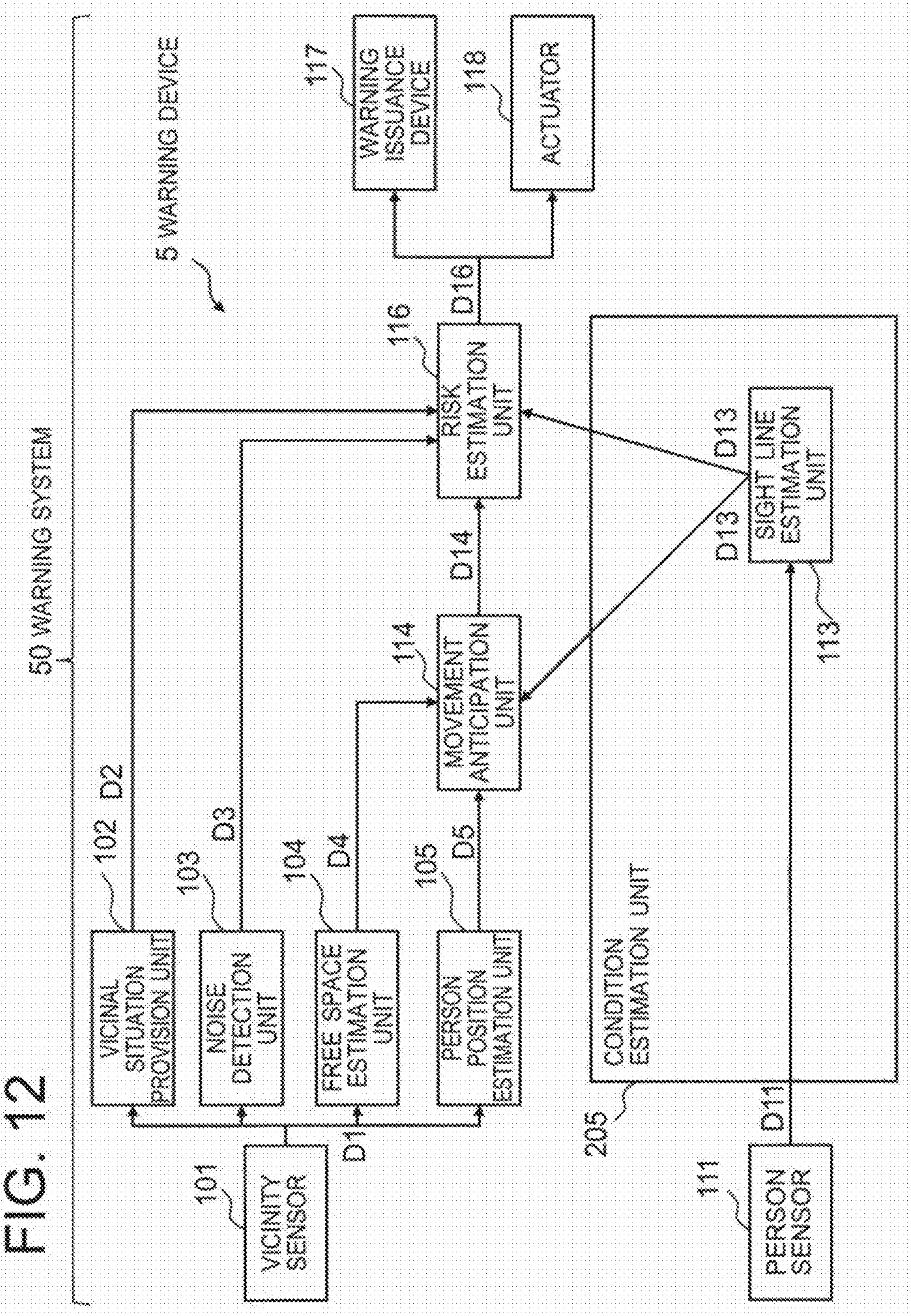
FIG. 12 is a block diagram schematically showing the configuration of a warning device and a warning system according to a fifth embodiment.

FIG. 12 is a block diagram schematically showing the configuration of a warning device 5 and a warning system 50 according to a fifth embodiment. The warning device 5 is a device capable of executing a warning method according to the fifth embodiment. In FIG. 12, each component identical or corresponding to a component shown in FIG. 1 is assigned the same reference character as in FIG. 1. In the warning device 5, a condition estimation unit 205 includes the sight line estimation unit 113. The warning device 5 differs from the warning device 1 according to the first embodiment in not including the walking estimation unit and the emotion estimation unit. Except for these features, the fifth embodiment is the same as the first embodiment.

Sixth Embodiment

Figure 13:
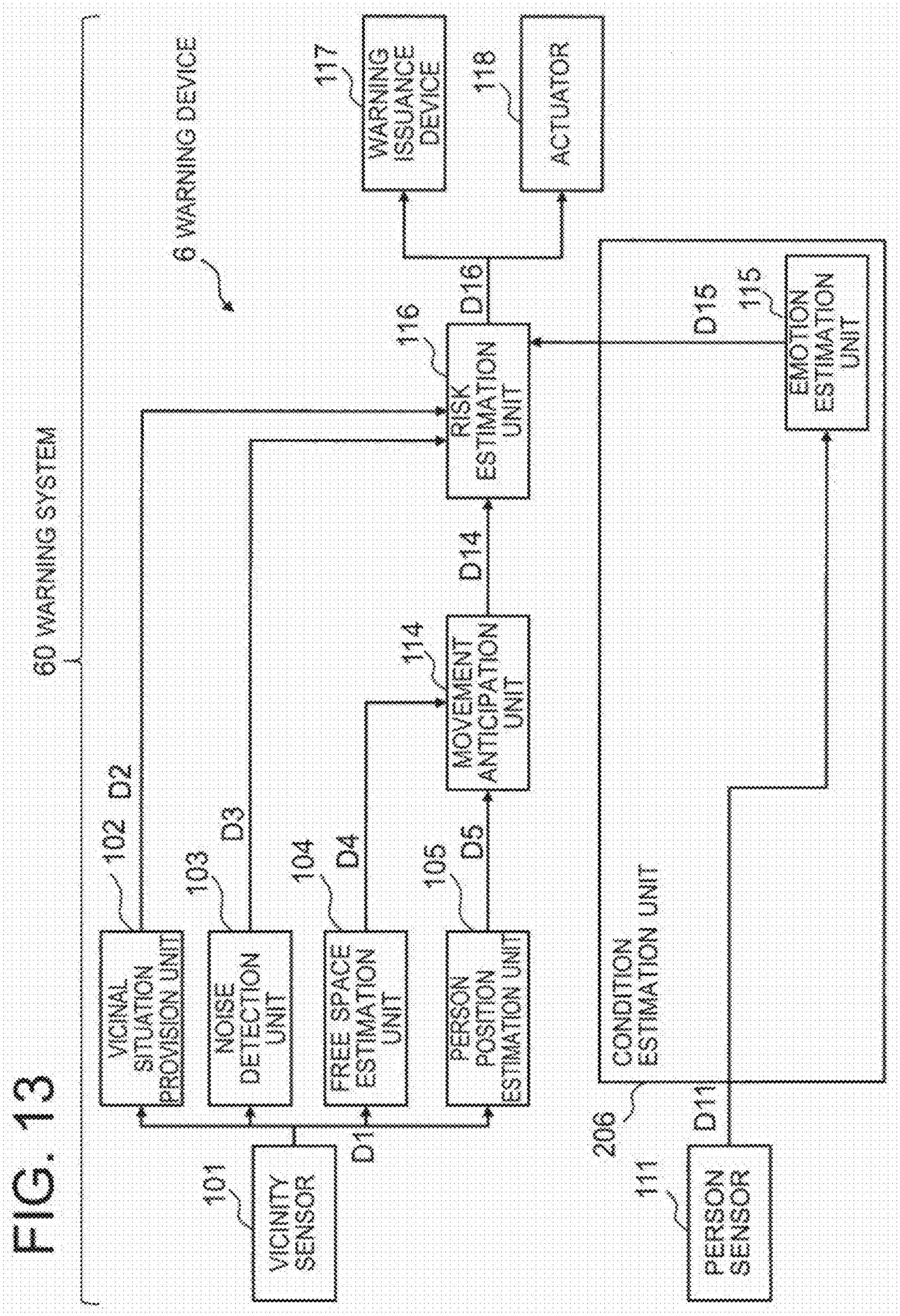
FIG. 13 is a block diagram schematically showing the configuration of a warning device and a warning system according to a sixth embodiment.

FIG. 13 is a block diagram schematically showing the configuration of a warning device 6 and a warning system 60 according to a sixth embodiment. The warning device 6 is a device capable of executing a warning method according to the sixth embodiment. In FIG. 13, each component identical or corresponding to a component shown in FIG. 1 is assigned the same reference character as in FIG. 1. In the warning device 6, a condition estimation unit 206 includes the emotion estimation unit 115. The warning device 6 differs from the warning device 1 according to the first embodiment in not including the walking estimation unit and the sight line estimation unit. Except for these features, the sixth embodiment is the same as the first embodiment.

Seventh Embodiment

Figure 14:
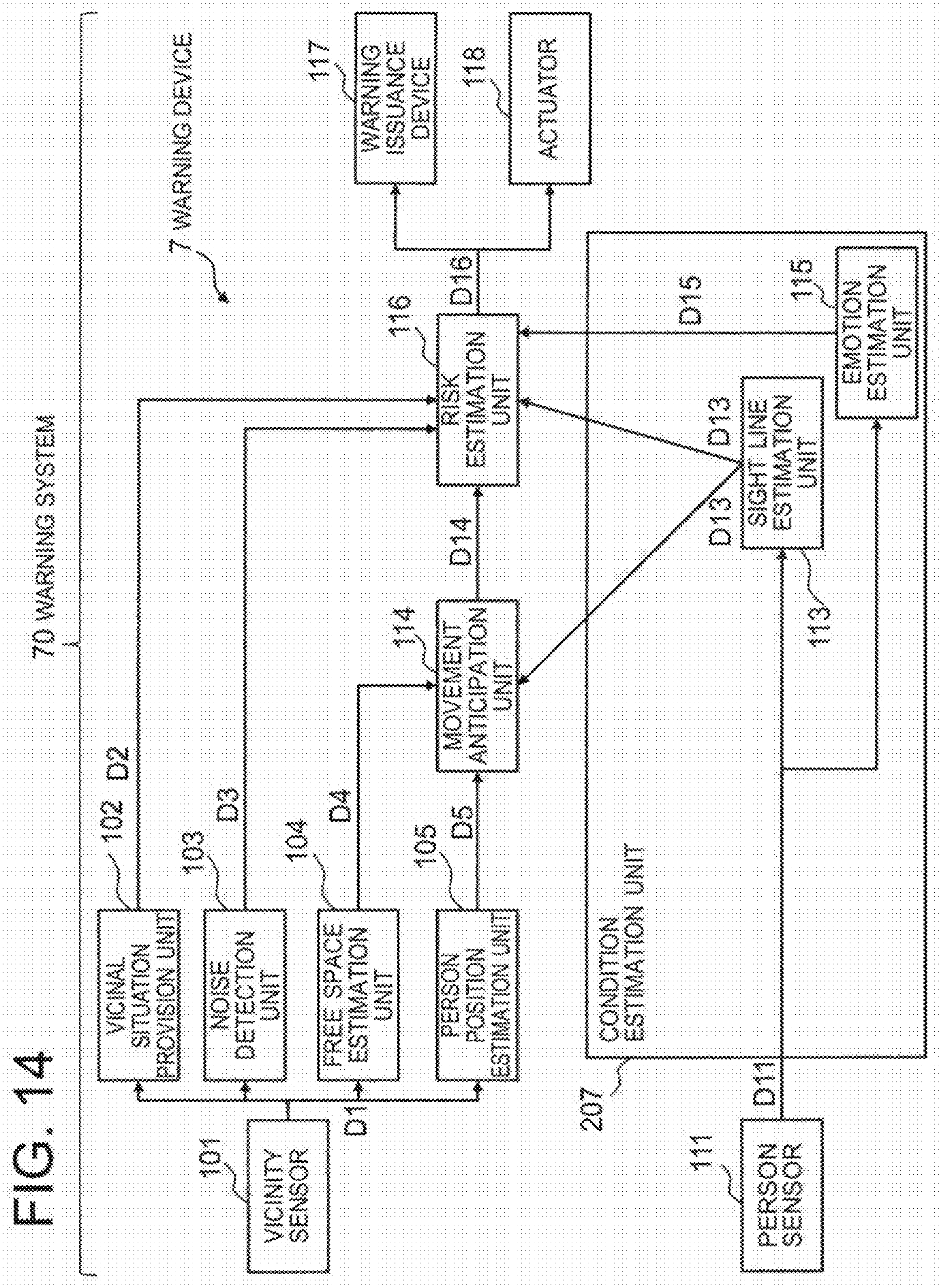
FIG. 14 is a block diagram schematically showing the configuration of a warning device and a warning system according to a seventh embodiment.

FIG. 14 is a block diagram schematically showing the configuration of a warning device 7 and a warning system 70 according to a seventh embodiment. The warning device 7 is a device capable of executing a warning method according to the seventh embodiment. In FIG. 14, each component identical or corresponding to a component shown in FIG. 1 is assigned the same reference character as in FIG. 1. In the warning device 7, a condition estimation unit 207 includes the sight line estimation unit 113 and the emotion estimation unit 115. The warning device 7 differs from the warning device 1 according to the first embodiment in not including the walking estimation unit. Except for these features, the seventh embodiment is the same as the first embodiment.

DESCRIPTION OF REFERENCE CHARACTERS 1-7: warning device, 10, 20, 30, 40, 50, 60, 70: warning system, 101: vicinity sensor, 102: vicinal situation provision unit, 103: noise detection unit, 104: free space estimation unit, 105: person position estimation unit, 111: person sensor, 112: walking estimation unit, 113: sight line estimation unit, 114: movement anticipation unit, 115: emotion estimation unit, 116: risk estimation unit, 117: warning issuance device, 118: actuator, 201-207: condition estimation unit.

What is claimed is:

1. A warning device comprising:

processing circuitry to estimate movement information including a position, a moving direction and a moving speed of an object person based on a first detection signal outputted from a vicinity sensor that performs sensing in regard to a vicinity of the object person;

to estimate a movement anticipation area, as an area through which the object person is anticipated to move, based on the movement information;

to provide vicinal situation information including a position of an obstacle, based on at least one of the first detection signal and previously acquired map information;

to estimate condition of the object person based on a second detection signal outputted from a person sensor on the object person that senses at least one of the condition and voice of the object person; and to make a judgment on whether the obstacle is a warning object or not based on the vicinal situation information, the movement anticipation area, and the condition of the object person, and to output a warning signal when the obstacle is a warning object, wherein the processing circuitry adjusts the movement anticipation area based on the condition of the object person, the processing circuitry estimates a wobble level representing magnitude of a wobble of the object person when walking, based on the second detection signal, and the processing circuitry widens the movement anticipation area with an increase in the wobble level based on the magnitude of the wobble of the object person.

2. The warning device according to claim 1, wherein the processing circuitry estimates a foot elevation level of the object person when walking based on the second detection signal, and the processing circuitry makes the judgment based on the vicinal situation information, the movement anticipation area, and the foot elevation level of the object person.

3. The warning device according to claim 1, wherein the processing circuitry estimates a fixation point indicating a position at which the object person is gazing, based on the second detection signal, and the processing circuitry regards the obstacle overlapping with the fixation point as not being a warning object when making the judgment.

4. The warning device according to claim 1, wherein the processing circuitry detects a noise signal in the second detection signal, and the processing circuitry determines the warning objects based on a noise level represented by the noise signal, the vicinal situation information, the movement anticipation area, and the condition of the object person.

5. The warning device according to claim 1, wherein the processing circuitry estimates a free space representing a region in which the object person can move, based on the first detection signal, and adjusts the movement anticipation area based on the free space.

6. A warning system comprising:

a vicinity sensor;

a person sensor;

a warning device; and a warning issuance device to issue a warning to an object person based on a warning signal, wherein the warning device comprises:

processing circuitry to estimate movement information including a position, a moving direction and a moving speed of the object person based on a first detection signal outputted from the vicinity sensor that performs sensing in regard to a vicinity of the object person;

to estimate a movement anticipation area, as an area through which the object person is anticipated to move, based on the movement information;

to provide vicinal situation information including a position of an obstacle, based on at least one of the first detection signal and previously acquired map information;

to estimate condition of the object person based on a second detection signal outputted from the person sensor on the object person that senses at least one of the condition and voice of the object person; and to make a judgment on whether the obstacle is a warning object or not based on the vicinal situation information, the movement anticipation area, and the condition of the object person, and to output the warning signal when the obstacle is a warning object, wherein the processing circuitry adjusts the movement anticipation area based on the condition of the object person, the processing circuitry estimates a wobble level representing magnitude of a wobble of the object person when walking, based on the second detection signal, and the processing circuitry widens the movement anticipation area with an increase in the wobble level based on the magnitude of the wobble of the object person.

7. The warning system according to claim 6, wherein the person sensor includes a wearable sensor attached to the object person, and the vicinity sensor includes a camera or a LiDAR.

8. A warning method to be executed by a warning device, comprising:

estimating movement information including a position, a moving direction and a moving speed of an object person based on a first detection signal outputted from a vicinity sensor that performs sensing in regard to a vicinity of the object person;

estimating a movement anticipation area, as an area through which the object person is anticipated to move, based on the movement information;

providing vicinal situation information including a position of an obstacle, based on at least one of the first detection signal and previously acquired map information;

estimating condition of the object person based on a second detection signal outputted from a person sensor on the object person that senses at least one of the condition and voice of the object person; and making a judgment on whether the obstacle is a warning object or not based on the vicinal situation information, the movement anticipation area, and the condition of the object person, and outputting a warning signal when the obstacle is a warning object, wherein the movement anticipation area is adjusted based on the condition of the object person, when estimating the movement anticipation area, a wobble level representing magnitude of a wobble of the object person when walking is estimated based on the second detection signal, when estimating the condition of the object person, and the movement anticipation area is widened with an increase in the wobble level based on the magnitude of the wobble of the object person, when estimating the movement anticipation area.

9. A non-transitory computer-readable record medium storing a warning program that causes a computer to execute:

estimating movement information including a position, a moving direction and a moving speed of an object person based on a first detection signal outputted from a vicinity sensor that performs sensing in regard to a vicinity of the object person;

estimating a movement anticipation area, as an area through which the object person is anticipated to move, based on the movement information;

providing vicinal situation information including a position of an obstacle, based on at least one of the first detection signal and previously acquired map information;

estimating condition of the object person based on a second detection signal outputted from a person sensor on the object person that senses at least one of the condition and voice of the object person;

making a judgment on whether the obstacle is a warning object or not based on the vicinal situation information, the movement anticipation area, and the condition of the object person, and outputting a warning signal when the obstacle is a warning object;

adjusting the movement anticipation area based on the condition of the object person, when estimating the movement anticipation area;

estimating a wobble level representing magnitude of a wobble of the object person when walking based on the second detection signal, when estimating the condition of the object person; and widening the movement anticipation area with an increase in the wobble level based on the magnitude of the wobble of the object person, when estimating the movement anticipation area.

* * * * *